United States Patent [19]

Sasaki et al.

[11] Patent Number: 5,101,462
[45] Date of Patent: Mar. 31, 1992

[54] WIDE-BAND OPTICAL FIBER COUPLER AND ITS MANUFACTURING METHOD

[75] Inventors: Hiroyuki Sasaki; Masato Shimamura, both of Tokyo; Yoshiaki Takeuchi, Mito; Hiroaki Hanafusa, Mito; Juichi Noda, Mito, all of Japan

[73] Assignees: Japan Aviation Electronics Industry Limited; Nippon Telegraph and Telephone Corporation, both of Tokyo, Japan

[21] Appl. No.: 584,710

[22] Filed: Sep. 19, 1990

[30] Foreign Application Priority Data

Sep. 20, 1989 [JP] Japan .................. 1-243980

[51] Int. Cl.⁵ ............................................ G02B 6/26
[52] U.S. Cl. ..................... 385/43; 359/900; 385/51
[58] Field of Search ............ 350/96.15, 96.16, 320

[56] References Cited

U.S. PATENT DOCUMENTS

| | | | |
|---|---|---|---|
| 4,291,940 | 9/1981 | Kawasaki et al. | 350/96.15 |
| 4,586,784 | 5/1986 | Tremblay et al. | 350/96.15 |
| 4,869,570 | 9/1989 | Yokohama et al. | 350/96.15 |
| 4,997,247 | 3/1991 | Stowe | 350/96.15 |
| 5,004,316 | 4/1991 | Hill et al. | 350/96.15 |
| 5,015,058 | 5/1991 | Thorncraft et al. | 350/96.15 |

FOREIGN PATENT DOCUMENTS

| | | |
|---|---|---|
| 0234665 | 9/1987 | European Pat. Off. |
| 2921035 | 11/1980 | Fed. Rep. of Germany |
| 88/09943 | 6/1988 | PCT Int'l Appl. |
| 90/08968 | 8/1990 | PCT Int'l Appl. |

OTHER PUBLICATIONS

"Plastic Optical Fiber Star Coupler" by Imoto et al., Applied Optics, vol. 25, No. 19, Oct. 1986, pp. 3443–3447.

*Primary Examiner*—John D. Lee
*Attorney, Agent, or Firm*—Pollock, VandeSande and Priddy

[57] ABSTRACT

Two single mode optical fibers are reduced in diameter over a predetermined length to form reduced-diameter portions whose center portions have different diameters. The two optical fibers are intersected at a small angle to each other substantially centrally of their reduced-diameter portions and then are fused together at the intersecting portions and the fused portions of the two optical fibers are heated and stretched to provide an optical coupler having a desired coupling ratio.

3 Claims, 1 Drawing Sheet

WIDE-BAND OPTICAL FIBER COUPLER AND ITS MANUFACTURING METHOD

BACKGROUND OF THE INVENTION

The present invention relates to a single mode wideband optical fiber coupler having reduced wavelength dependence of its splitting ratio, and a method of making such an optical fiber coupler.

A conventional single mode optical fiber coupler is produced by twisting together a prestretched optical fiber and an unstretched one, or by fusing together such optical fibers held in parallel juxtaposition with each other and then stretching their coupling region, as set forth in PCT Publication W087/00934 or Japanese Patent Kokai (or Application Laid Open) No. 108311/88 based on U.S. patent application Ser. No. 918,966 filed Oct. 15, 1986 (U.S. Pat. No. 4,798,438).

In the manufacture of a single mode optical fiber coupler having reduced wavelength dependence of its splitting ratio, the ratio between the diameters of the two optical fibers in the region where they are fused together determines the optical characteristics of the optical fiber coupler. It is therefore important to implement the above-said diameter ratio without scatter. However, since the diameter of a reduced-diameter portion 13 of a prestretched optical fiber 11 varies along its longitudinal direction as shown in FIG. 1, the diameter ratio between the diameters of the two optical fibers changes with the position where they are fused together.

The conventional manufacturing method disclosed in the above-mentioned PCT publication does not ever take into account a solution to such a problem, and hence is very low in the yield rate of product.

In the above-mentioned Japanese Patent Kokai, it is proposed as a solution to the problem to stretch the optical fiber or to reduce the diameter of the optical fiber by chemical etching so that the reduced diameter is uniform along the longitudinal direction of the fiber. It is very difficult, however, to draw the optical fiber while holding its diameter uniform lengthwise thereof. Moreover, even if the diameter of each optical fiber can be reduced uniformly over a certain length, it is also very hard to maintain the two optical fibers in parallel juxtaposition with each other. As shown in FIG. 2, the optical fibers each bend largely at both ends of their contact portions 13 disposed in parallel to each other, and this bending increases the transmission loss of the optical fiber coupler.

As mentioned above, the manufacture of an optical fiber coupler having reduced wavelength dependence of its splitting ratio calls for stabilizing the ratio between the diameters of the two optical fibers in the region where they are fused together. To this end, the prior art stretches each optical fiber or decreases its diameter by chemical etching so that the diameter is uniform over in its longitudinal direction. However, much difficulty is encountered in reducing the diameter of the optical fiber without changing the diameter lengthwise thereof i.e. the central portion of the reduced-diameter portion is smaller in diameter than its end portions, and consequently, it is very difficult to maintain the two optical fibers in parallel juxtaposition with each other.

SUMMARY OF THE INVENTION

It is therefore an object of the present invention to provide a single-mode optical fiber coupler in which the reduced-diameter portion of each of two optical fibers may vary lengthwise thereof and their reduced diameter portions need not be disposed in parallel juxtaposition with each other but the coupler nevertheless has reduced wavelength dependence of its splitting ratio.

Another object of the present invention is to provide a method of making such an optical fiber coupler.

The single mode optical fiber coupler of the present invention includes first and second optical fibers each having a reduced-diameter portion that intersects the other at a small angle thereto substantially centrally of the reduced-diameter portions, the intersecting portions being fused together and stretched.

The single mode optical fiber coupler manufacturing method of the present invention includes a step of stretching first and second optical fibers or reducing their diameters by chemical etching to form the reduced-diameter portions, a step of maintaining the first and second optical fibers so that they intersect each other at a small angle substantially centrally of their reduced-diameter portions, a step of fusing together the intersecting portions to form a coupling region, and a step of stretching at least the coupling region.

As shown in FIG. 1, the diameter of an optical fiber normally stretched while being heated is usually minimum at its center portion and the diameter increases toward both ends thereof. The portion where the diameter changing ratio is the smallest is the center portion. Also in the case where the diameter of an optical fiber is reduced by chemical etching, there is the tendency for the central portion to become thinner than any other portions, though not so conspicuous as in the above case. According to the present invention, since the optical fibers are fused together at their central intersecting portions where the diameter changing ratio is the smallest, the diameter ratio between the optical fibers in the coupling region is substantially constant and stable, thus permitting the fabrication of optical fiber couplers of uniform performance. Furthermore, since the present invention does not involve the difficult steps of stretching each optical fiber so that the reduced diameter portion is uniform in its longitudinal direction and of maintaining the optical fibers in parallel juxtaposition with each other, the optical fiber coupler of the present invention is easy to manufacture.

DESCRIPTION OF THE PREFERRED EMBODIMENT

Figure 3A:
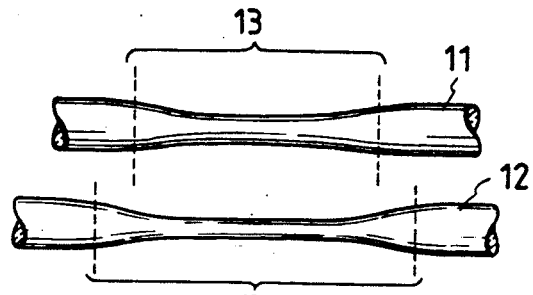
FIG. 3A is a diagram for explaining a step involved in the manufacture of the optical fiber coupler according to the present invention.
Figure 3B:
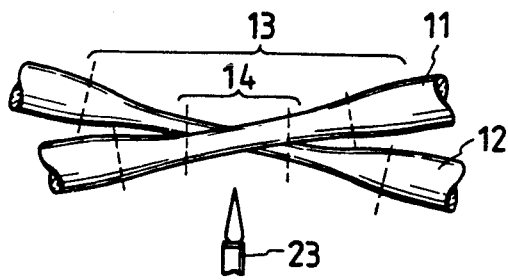
FIG. 3B is a diagram for explaining a manufacturing step immediately subsequent to the step depicted in FIG. 3B.

FIGS. 3A and 3B are diagrams for explaining the single mode optical fiber coupler manufacturing method according to the present invention. As shown in FIG. 3A, single mode optical fibers 11 and 12 are each heated and prestretched a desired length or reduced in diameter by chemical etching to form a reduced-diameter portion 13. Then, the optical fibers 11 and 12 are disposed so that they intersect each other substantially centrally of their reduced-diameter portions 13 as depicted in FIG. 3B. The intersecting portions 14 are fused together and the fused portion or coupling region and the neighboring regions are then stretched until a desired coupling ratio is obtained.

Figure 1:
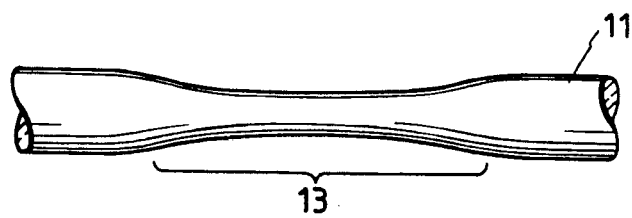
FIG. 1 is a diagram showing a reduced-diameter portion 13 of an optical fiber for use in a conventional optical fiber coupler manufacturing method.
Figure 2:
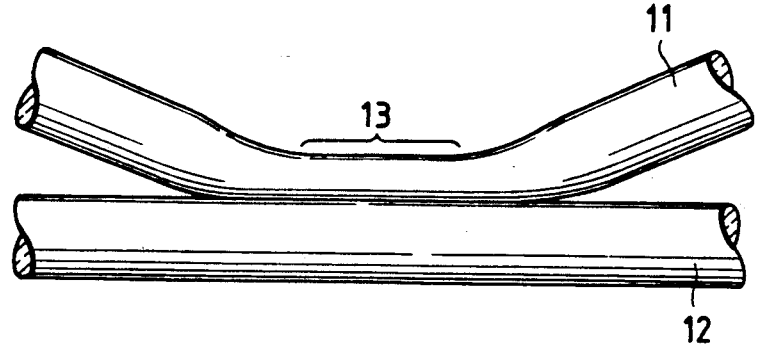
FIG. 2 is a diagram for explaining a conventional manufacturing method.
Figure 4:
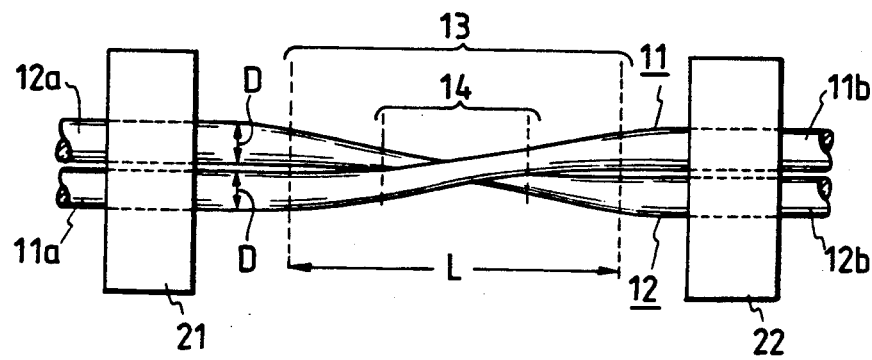
FIG. 4 is a diagram for explaining an embodiment of the present invention.

The single mode optical fibers 11 and 12 each having a clad outer diameter of 125 μm, for example, are prestretched about 10 mm in the diameter reducing step shown in FIG. 3A to form reduced-diameter portions 13 which are respectively about 86 and 79 μm in their minimum diameters centrally thereof and about 10 mm long. Next, the optical fibers 11 and 12 are fused together, with their reduced-diameter portions 13 intersecting each other substantially centrally thereof as depicted in FIG. 3B. In this instance, as shown in FIG. 4, the optical fibers 11 and 12 are held in substantially parallel and adjacent relation to each other by means of jigs 21 and 22 outside their reduced-diameter portions 13, and the plane of arrangement of the optical fibers 11 and 12 is flush with the plane of their arrangement in the jig 22. In other words, four segments 11a, 11b and 12a, 12b of the optical fibers 11 and 12 at both sides of the reduced-diameter portions 13 are flush with one another, and the segments 11a and 12a of the optical fibers 11 and 12 at one side are exchanged in position with respect to the segments 11b and 12b at the other side. Letting the length of the reduced-diameter portion 13 and the original diameter of each optical fiber be represented by L and D, respectively, the angle of intersection between the optical fibers 11 and 12 is less than 2D/L rad at the largest. The intersecting portions 14 of the optical fibers 11 and 12 disposed as mentioned above and held by the jigs 21 and 22 are fused together by heating them with a burner 23, thereafter being stretched. The excess loss of the optical fiber couple produced by the above-described method was measured. The excess loss of the optical fiber coupler of the prior art example (shown in FIG. 2) was about 1 dB, whereas the excess loss of the optical fiber coupler according to this embodiment was less than 0.5 dB—this is a substantial improvement of its performance.

As described above, according to the present invention, each optical fiber is reduced in diameter over a predetermined length and their center portions where the changing ratios of their reduced diameters are minimum are intersected at a small angle to each other and then are fused together; consequently, the ratio between the diameters of the two fused portions of the two optical fibers remains substantially constant, permitting the fabrication of optical fiber couplers of uniform performance, in particular, whose excess loss is stable at a small value. Moreover, the reduced-diameter portions are not maintained in parallel juxtaposition with each other but instead they intersect each other, so that the present invention facilitates production of the optical fiber coupler and improves productivity accordingly.

It will be apparent that many modifications and variations may be effected without departing from the scope of the novel concepts of the present invention.

What is claimed is:

1. A wide-band optical coupler comprising first and second single mode optical fibers respectively having reduced-diameter longitudinal portions of different diameters centrally thereof, said first and second optical fibers being disposed in intersecting relation at a small angle to one another substantially centrally of their reduced diameter portions, the intersecting portions of said fibers being fused together and stretched, and said first and second optical fibers having further portions at opposing ends of said coupler that are disposed in adjacent parallel relation to each other in the same plane at either side of said reduced-diameter portions, the respective positions of said further portions of said first and second optical fibers at one end of said coupler being exchanged relative to their respective positions at the other end of said coupler.

2. A method of making a wide-band optical coupler, comprising the steps of:
   heating and stretching each of two single mode optical fibers to reduce their diameters over predetermined lengths so as to form reduced diameter longitudinal portions of different diameters centrally thereof;
   intersecting said two optical fibers at a small angle substantially centrally of said reduced diameter portions while holding end portions of said two optical fibers in parallel and adjacent relation to each other in the same plane at either side of each of said reduced diameter portions; and
   fusing together and then stretching said intersecting portions of said two optical fibers.

3. The method of claim 2 wherein the angle of intersection of said reduced diameter portions of said fibers is no greater than 2D/L rad, where D is the original diameter of each of said optical fibers and L is the length of the reduced diameter portion of each fiber.

* * * * *